United States Patent
Cheon (10) Patent No.: US 10,818,181 B1
(45) Date of Patent: Oct. 27, 2020

(54) VEHICLE AND CONTROLLING METHOD OF THE SAME

(71) Applicants: HYUNDAI MOTOR COMPANY, Seoul (KR); KIA MOTORS CORPORATION, Seoul (KR)

(72) Inventor: Wang Seong Cheon, Hwaseong-si (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 0 days.

(21) Appl. No.: 16/585,830

(22) Filed: Sep. 27, 2019

(30) Foreign Application Priority Data

Jul. 15, 2019 (KR) ........................ 10-2019-0085001

(51) Int. Cl.
| | |
|---|---|
| *G06G 1/14* | (2006.01) |
| *G08G 1/14* | (2006.01) |
| *B60W 10/26* | (2006.01) |
| *G08G 1/04* | (2006.01) |
| *B60W 50/04* | (2006.01) |

(52) U.S. Cl.
CPC ............. *G08G 1/146* (2013.01); *B60W 10/26* (2013.01); *G08G 1/04* (2013.01); *B60W 2050/046* (2013.01); *B60W 2420/42* (2013.01); *B60W 2510/244* (2013.01)

(58) Field of Classification Search
CPC ......... G08G 1/146; G08G 1/04; B60W 10/26; B60W 2050/046; B60W 2420/42; B60W 2510/244
USPC ......................................................... 30/932.2
See application file for complete search history.

(56) References Cited

U.S. PATENT DOCUMENTS

| | | | |
|---|---|---|---|
| 2014/0085112 A1* | 3/2014 | Gruteser ................ | B60Q 9/004 340/932.2 |
| 2015/0310744 A1* | 10/2015 | Farrelly ................. | G08G 1/005 340/932.2 |
| 2016/0129883 A1* | 5/2016 | Penilla ................... | G08G 1/146 348/148 |
| 2020/0258388 A1* | 8/2020 | Nakka ................ | G06K 9/00812 |

FOREIGN PATENT DOCUMENTS

KR    10-2015-0052706 A    5/2015

* cited by examiner

*Primary Examiner* — Omar Casillashernandez
(74) *Attorney, Agent, or Firm* — Brinks Gilson & Lione

(57) ABSTRACT

A vehicle and a controlling method of the vehicle are provided. The vehicle may include: a battery; a plurality of cameras powered by the battery; a GPS sensor configured to detect a GPS signal; a storage configured to store map information; and a controller configured to determine a parking location based on the map information and the GPS signal, determine a fixed object based on images captured by the plurality of cameras and deactivate at least one camera of the plurality of cameras based on the parking location, the fixed object and a state of charge (SOC) of the battery.

20 Claims, 6 Drawing Sheets

| PARKING AREA O | | PARKING AREA X | |
|---|---|---|---|
| FIXED OBJECT PRESENCE O | FIXED OBJECT PRESENCE X | FIXED OBJECT PRESENCE O | FIXED OBJECT PRESENCE X |
| SOC < 80% | SOC < 80% | SOC < 50% | SOC < 50% |
| 1 MINUTE ELAPSED? | 5 MINUTE ELAPSED? | 20 MINUTE ELAPSED? | 30 MINUTE ELAPSED? |
| CAMERA SELECTION | CAMERA SELECTION | CAMERA SELECTION | CAMERA SELECTION |
| WAKE UP EVERY 120 MINUTES | WAKE UP EVERY 120 MINUTES | WAKE UP EVERY 60 MINUTES | WAKE UP EVERY 60 MINUTES |

FIG. 6

| OBJECT | CAMERA CURRENT CONSUMPTION | | |
| --- | --- | --- | --- |
|  | FRONT ON / REAR ON | FRONT ON / REAR OFF | FRONT OFF / REAR ON |
| CONTROLLER | 270 mA | 270 mA | 270 mA |
| FRONT CAMERA | 155 mA | 155 mA | - |
| REAR CAMERA | 105 mA | - | 105 mA |
| TOTAL CURRENT CONSUMPTION | 540 mA | 435 mA | 385 mA |
| MAXIMUM USAGE TIME | 13HOURS | 16HOURS | 18HOURS |

VEHICLE AND CONTROLLING METHOD OF THE SAME

CROSS-REFERENCE TO RELATED APPLICATION

The present application claims priority to and the benefit of Korean Patent Application No. 10-2019-0085001, filed on Jul. 15, 2019, which is incorporated herein by reference in its entirety.

TECHNICAL FIELD

The present disclosure relates to a vehicle controlling a camera and a method of controlling the vehicle.

BACKGROUND

The statements in this section merely provide background information related to the present disclosure and may not constitute prior art.

Recently, a vehicle has been developed to develop a Drive Video Record System (DVRS) that photographs a blind spot or the rear of a vehicle for the convenience of a user and records an external image in place of an evidence image or a witness at the time of a traffic accident.

In these DVRS, there is a method for minimizing power consumption. Korean Patent Publication No. 2015-0052706 discloses a technique of determining whether an event of a region of interest in a camera image is occurred and minimizing power consumption of the system according to the determination result.

However, this conventional technology may not stop the operation of the camera itself even in an environment where camera operation is unnecessary.

SUMMARY

The present disclosure provides a vehicle and a method of controlling the vehicle to reduce power consumption and improve the efficiency of the camera operation in the parking mode by applying the parking area where the vehicle is located and the situation in the parking area as a factor in determining whether the camera is powered on or off.

In one form of the present disclosure, a vehicle includes: a battery; a plurality of cameras operating on the power of the battery; a GPS sensor to detect GPS signal; a storage to store a map information; and a controller configured to determine a parking location based on the map information and the GPS signal, determine a fixed object based on the captured images of the plurality of cameras and turn off at least one of the plurality of cameras based on the parking location, the fixed object and a state of charge (SOC) of the battery.

The controller is configured to turn off a first camera based on the first charge amount of the SOC and a predetermined first reference time when the controller determines the fixed object from the captured images of the first camera among the plurality of cameras and determine that the parking location is within a parking area.

The controller is configured to turn off the first camera based on the first charge amount of the SOC and a predetermined second time longer than the predetermined first reference time when the controller determines that there is no fixed object in the captured image of the first camera and the parking location is within the parking area.

The controller is configured to keep the first camera turned on when a second camera is turned off.

The controller is configured to turn off the first camera based on a second charge amount of the SOC and a predetermined third reference time when the controller determines that the parking location is out of the parking area and determines the fixed object from the captured images of the first camera.

The controller is configured to turn off the first camera based on the second charge amount of the SOC and a predetermined fourth time longer than the predetermined third reference time when the controller determines that the parking location is out of the parking area and there is no fixed object in the captured image of the first camera.

The controller is configured to keep the first camera turned on when a second camera is turned off.

The controller is configured to turn on the turned off camera according to a predetermined period based on the parking location after the at least one camera is turned off, The vehicle further includes: a gyro sensor to detect an external impact, wherein the controller is configured to turn on the turned off camera based on the detection value of the gyro sensor regardless of the predetermined period.

The controller is configured to turn off at least one of the plurality of cameras based on the parking location, the fixed object, and the state of charge (SOC) of the battery after the camera is turned on.

In another form of the present disclosure, a method of controlling a vehicle comprising a plurality of cameras includes: determining a parking location based on a stored map information and a GPS signal; determining a fixed object based on a captured images of the plurality of cameras; and turning off at least one of the plurality of cameras based on the parking location, the fixed object and a state of charge (SOC) of the battery.

The determining the parking location and the fixed object includes: determining the fixed object from a captured images of a first camera among the plurality of cameras and determining that the parking location is within a parking area, wherein the turning off includes: turning off the first camera based on a first charge amount of the SOC and a predetermined first reference time The determining the parking location and the fixed object includes: determining that there is no fixed object in the captured image of the first camera and the parking location is within the parking area, wherein the turning off includes: turning off the first camera based on the first charge amount of the SOC and a predetermined second time longer than the predetermined first reference time.

The turning off includes: keeping the first camera turned on when a second camera is turned off.

The determining the parking location and the fixed object includes: determining that the parking location is out of the parking area and determining the fixed object from the captured images of the first camera, wherein the turning off includes: turning off the first camera based on a second charge amount of the SOC and a predetermined third reference time.

The determining the parking location and the fixed object includes: determining that the parking location is out of the parking area and there is no fixed object in the captured image of the first camera, wherein the turning off includes: turning off the first camera based on the second charge amount of the SOC and a predetermined fourth time longer than the predetermined third reference time.

The turning off includes: keeping the first camera turned on when a second camera is turned off The method further comprises: turning on the turned off camera according to a predetermined period based on the parking location after the at least one camera is turned off.

The turning on includes: turning on the turned off camera based on the detection value of a gyro sensor regardless of the predetermined period The method further includes: turning off at least one of the plurality of cameras based on the parking location, the fixed object, and the state of charge (SOC) of the battery after the camera is turned on.

Further areas of applicability will become apparent form the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Throughout the specification of the present disclosure, terms " . . . part", " . . . module", " . . . member", " . . . block", and the like mean an element capable of being implemented by hardware, software, or a combination thereof. As used in the specification and appended claims, the term " . . . parts", " . . . modules", " . . . members", or " . . . blocks" may be implemented by a single constituent element, or the term " . . . part", " . . . module", " . . . member", or " . . . block" may include a plurality of constituent elements.

Throughout the specification of the present disclosure, if it is assumed that a certain part is connected (or coupled) to another part, the term "connection or coupling" means that the certain part is directly connected (or coupled) to another part and/or is indirectly connected (or coupled) to another part. Here, indirect connection (or indirect coupling) may conceptually include connection (or coupling) over a wireless communication network.

Throughout the specification of the present disclosure, if it is assumed that a certain part includes a certain component, the term "comprising or including" means that a corresponding component may further include other components unless context clearly indicates otherwise.

In description of the present disclosure, the terms "first" and "second" may be used to describe various components, but the components are not limited by the terms. These terms may be used to distinguish one component from another component.

The terms "a", "an", "one", "the" and other similar terms include both singular and plural forms, unless context clearly dictates otherwise.

Identification numbers for use in respective operations to be described later are used for convenience of description and better understanding of the present disclosure, do not describe the order or sequence of the respective operations of the present disclosure, and the respective operations of the present disclosure may be carried out in a different way from the order written in the present disclosure, unless context of each operation clearly indicates a specific order.

The principles of the present disclosure and some forms of the present disclosure will hereinafter be given with reference to the attached drawings.

Figure 1:
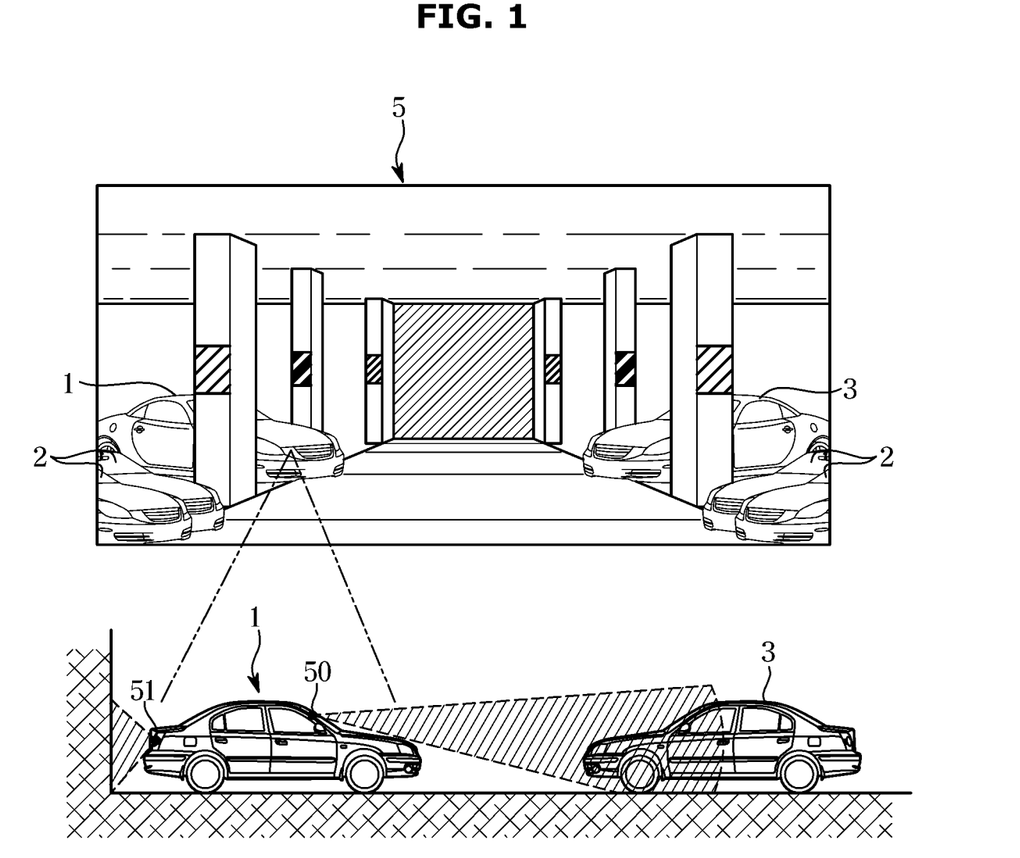
FIG. 1 is a view schematically showing a vehicle parked in a parking area.

FIG. 1 is a view schematically showing a vehicle parked in a parking area.

Referring to FIG. 1, the disclosed vehicle 1 may park in a parking area. Here, the parking area is a space provided for a general vehicle to stop. The parking area may include various places in addition to the underground parking lot 5 illustrated in FIG. 1, and may include various places including an area indicating a parking area in the map information used in the navigation and an indication indicating a parking area.

The vehicle 1 was stopped by rear parking in the underground parking lot 5 in which the surrounding vehicle 2 was parked. The vehicle 1 may photograph the vehicle 3 parked in front through the front camera 50 provided in the front of the vehicle body. In addition, the vehicle 1 may photograph the wall surface of the underground parking lot 5 through the rear camera 51.

The vehicle 1 determines the fixed object based on the captured image. The fixed object means an object that is expected to be unchanged while the vehicle 1 is parked. That is, the vehicle 1 determines the fixed object determined to be difficult to damage the vehicle 1 through the captured image, and minimizes power consumption by turning off the power of the camera corresponding to the area where the fixed object exists.

Referring back to FIG. 1, the vehicle 1 may identify the vehicle 3 that is stopped in the image captured by the front camera 50. The vehicle 1 may determine that the vehicle 3 is not a fixed object because the stopped vehicle 3 is parked at a position far from the vehicle 1.

The vehicle 1 may check the walls of the underground parking lot 3 in the image captured by the rear camera 51. The vehicle 1 may determine the wall as a fixed object. The vehicle 1 may turn off the power of the rear camera 51 corresponding to the fixed object.

Meanwhile, in FIG. 1, the vehicle 1 includes only the front camera 50 and the rear camera 51. However, the vehicle 1 does not necessarily include two cameras, and the number of cameras and the position of the cameras may vary.

Figure 2:
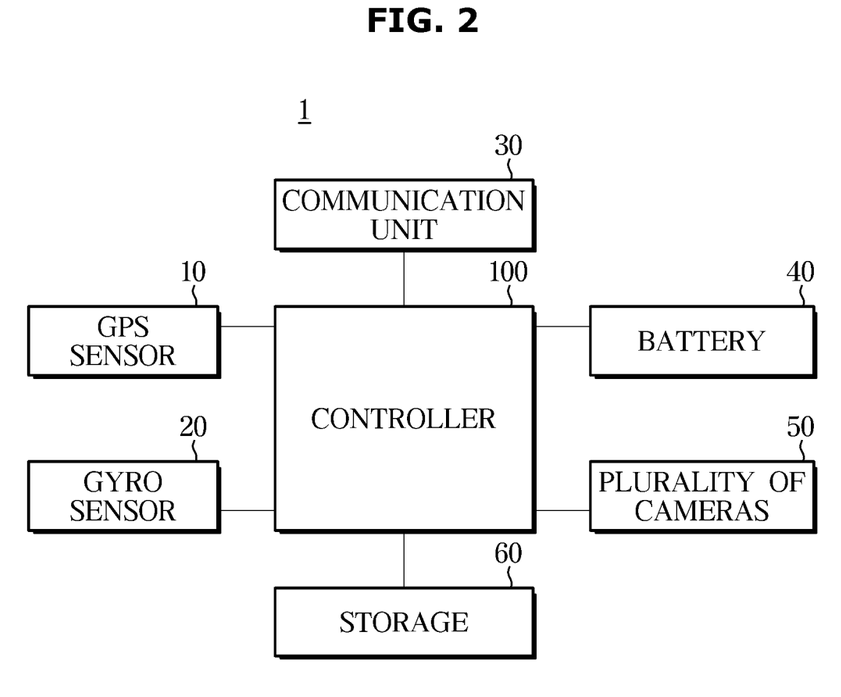
FIG. 2 is a control block diagram of a vehicle in one form of the present disclosure.

FIG. 2 is a control block diagram of a vehicle in some forms of the present disclosure.

Referring to FIG. 2, the vehicle 1 includes a GPS sensor 10 for detecting a GPS (Global Position System) signal, a gyro sensor 20 for measuring angular velocity, a communication unit 30 for communicating with the outside, a battery 40 for supplying power to an electronic device included in the vehicle 1, a plurality of cameras 50 operated by receiving power from the battery 40, a storage 60 for storing various data such as data and map information detected by the GPS sensor 10 and the like and a controller 100 for controlling each configuration described above.

The GPS sensor 10 generates a GPS signal that can grasp information about the current position of the vehicle 1. The GPS sensor 10 receives a signal from a satellite through an antenna provided in the vehicle 1, and calculates a position of the vehicle 1 based on the received signal. The GPS signal calculated by the GPS sensor 10 is mapped to map information and used to determine the parking location of the vehicle 1.

The gyro sensor 20 measures the angular velocity, and the measured angular velocity is used in various ways. The vehicle 1 may determine the external impact based on the angular velocity measured in the parked state. After determining the external impact based on the detection value of the gyro sensor 20, the vehicle 1 may control to capture an image causing the external impact by turning on the turned off camera among the plurality of cameras 50.

The communication unit 30 transmits and receives a signal to the outside of the vehicle 1. The signal received by the communication unit 30 may be map information transmitted from the user terminal, the server, and the surrounding vehicles. The map information may be stored in the storage 60 and used to determine the parking location of the vehicle 1 through the GPS signal.

In addition, the communication unit 30 may collect various data necessary for the control method of the vehicle, which will be described later, from the outside. And when external impact is applied, the communication unit 30 may transmit an external impact detection and photographed images to the user terminal.

The communication unit 30 may include one or more components that enable communication with an external device and may include, for example, at least one of a short range communication module, a wired communication module, and a wireless communication module.

The short range communication module may include a variety of short-range communication modules for transmitting/receiving signals over a wireless communication network over a short distance, for example, a Bluetooth module, an infrared (IR) communication module, a Radio Frequency Identification (RFID) communication module, a Wireless Local Area Network (WLAN) communication module, a Near Field Communication (NFC) communication module, a ZigBee communication module, etc. The wired communication module may include not only various wired communication modules but also various cable communication modules, for example, Universal Serial Bus (USB), High Definition Multimedia Interface (HDMI), Digital Visual Interface (DVI), RS-232 (recommended standard232), power line communication, a Plain Old Telephone Service (POTS), etc. The wireless communication module may include various wired communication modules, for example, a Wi-Fi module, and a Wireless broadband (Wi-Bro) module, and may further include a wireless communication module for supporting various wireless communication schemes, for example, Global System for Mobile Communication (GSM), Code Division Multiple Access (CDMA), Wideband Code Division Multiple Access (WCDMA), Universal Mobile Telecommunications System (UMTS), Time Division Multiple Access (TDMA), Long Term Evolution (LTE), etc.

The battery 40 supplies power to various electronic devices in the vehicle 1. The battery 40 may be provided with various capacities and may be charged through regenerative braking while the vehicle 1 is driving.

The battery 40 transmits to the controller 100 indicating the current charge amount. The controller 100 determines a state of the battery 40, that is, a state of charge (SOC) based on the received signal. The controller 100 turns off the camera based on the SOC.

The plurality of cameras 50 photographs not only the inside of the vehicle 1 but also the outside. The signal photographed by the camera 50 is transmitted to the controller 100 after undergoing image processing. The controller 100 determines the fixed object through the processed image.

The position at which the plurality of cameras 50 are provided in the vehicle 1 is not limited, and it is sufficient to include two or more cameras.

The storage 60 stores not only map information but also various data such as reference values described later with reference to FIG. 5, and provides data necessary for the determination process of the controller 100.

The storage 60 may be implemented as any one of a non-volatile memory (e.g., a cache, a Read Only Memory (ROM), a Programmable ROM (PROM), an Erasable Programmable ROM (EPROM), an Electrically Erasable Programmable ROM (EEPROM), a flash memory, etc.), a volatile memory (e.g., a Random Access Memory (RAM)), and a storage medium (e.g., a Hard Disk Drive (HDD), a CD-ROM, etc.), the scope or spirit of the present disclosure is not limited thereto.

The controller 100 controls the overall of the vehicle 1.

Specifically, the controller 100 maps the GPS signal of the GPS sensor 10 to the map information stored in the storage 60 to determine the parking location of the currently parked vehicle 1. The controller 100 determines the fixed object based on the captured images of the plurality of cameras 50. The controller 100 selects a camera to be turned off from among the plurality of cameras in consideration of the parking location, the fixed object, and the SOC of the battery 40.

After the selected camera is turned off, the controller 100 periodically turns on the camera to take a picture of the unexpected surroundings of the vehicle 1. At this time, the controller 100 may determine the period time in consideration of the parking location and the fixed object.

The controller 100 may be implemented by memory that stores algorithms for controlling the operation of components in vehicle 10 or data for a program that reproduces the algorithm, and by processor for performing the above-described operation using the data stored in the memory. In this case, the memory and the processor may be implemented as separate chips. Alternatively, the memory and the processor may be implemented in a single chip. The operation of the above-described controller 100 will be described later through other drawings below.

Meanwhile, in FIG. 2, at least one component may be added or deleted to correspond to the performance of the components. For example, the storage 60 may be a memory implemented as a separate chip from the processor described above with respect to the controller 100, or may be implemented as a single chip with the processor.

Figure 3:
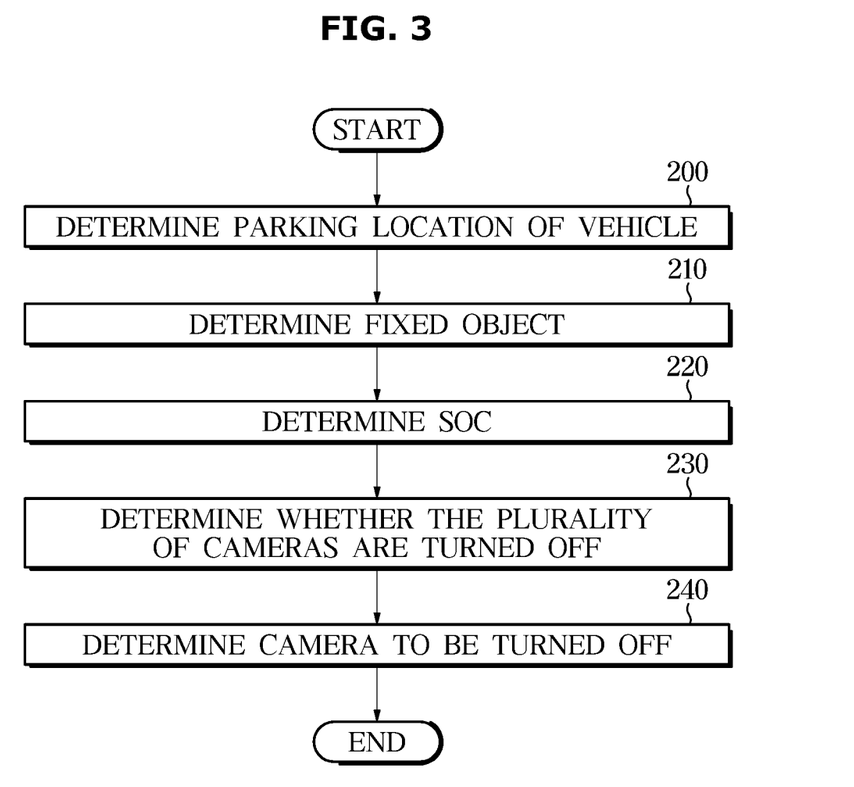
FIG. 3 is a flowchart illustrating a control method of a vehicle in one form of the present disclosure.

FIG. 3 is a flowchart illustrating a control method of a vehicle in some forms of the present disclosure.

Referring to FIG. 3, the controller 100 determines a parking location of the vehicle 1 (200). Parking location is determined by mapping GPS signals to map information. In detail, when the mapped GPS signal is determined as one point of the map information where the GPS signal is located, the controller 100 determines whether the corresponding location is a parking area. If the GPS signal is mapped to a point designated as parking area in the map information, the controller 100 may determine that the vehicle 1 is parked in the parking area.

The controller 100 may determine that the vehicle 1 is stopped in an area other than the parking area. In this case, when The controller 100 determine that the vehicle 1 is parked in an area other than the parking area, the controller 100 prepares for a risk that may be applied to the vehicle 1 during parking by setting a long time for keeping the camera on.

The controller 100 determines the fixed object (210).

The fixed object may be determined based on images captured by the plurality of cameras 50. When it is determined that the vehicle 1 is parked, the controller 100 photographs the surroundings of the vehicle 1 parked through the plurality of cameras 50. In the captured image, the controller 100 determines the fixed object and distinguishes the camera corresponding to the region where the fixed object exists from the camera corresponding to the region where the fixed object does not exist.

The controller 100 determines an SOC (220).

The controller 100 collects information about the electric energy currently charged from the battery 40. The amount of SOC collected is a criterion for determining the time to turn on the camera while the vehicle 1 is parked. That is, when the amount of charge of the battery 40 falls below a predetermined criterion, the controller 100 may perform an efficient power supply by turning off the selected camera.

The controller 100 determines whether the plurality of cameras 50 are turned off (230).

The best way to minimize power consumption is to turn off all of the plurality of cameras 50. However, if all of the plurality of cameras 50 are turned off, an unexpected external impact cannot be taken. Therefore, the controller 100 turns off only the camera photographing the fixed object, which is unlikely to cause an unexpected external impact, and maintains the rest of the camera.

However, if there are a plurality of cameras photographing the fixed object, the controller 100 determines whether there is a camera that does not photograph the fixed object. When there is a camera that does not photograph the fixed object, the controller 100 turns off the plurality of cameras that photograph the fixed object. However, when there is no camera that has not photographed the fixed object, the controller 100 may select one or more cameras among the plurality of cameras that have photographed the fixed object.

After determining the camera to be turned off (240), the controller 100 executes the control method described later in FIG. 4.

Figure 4:
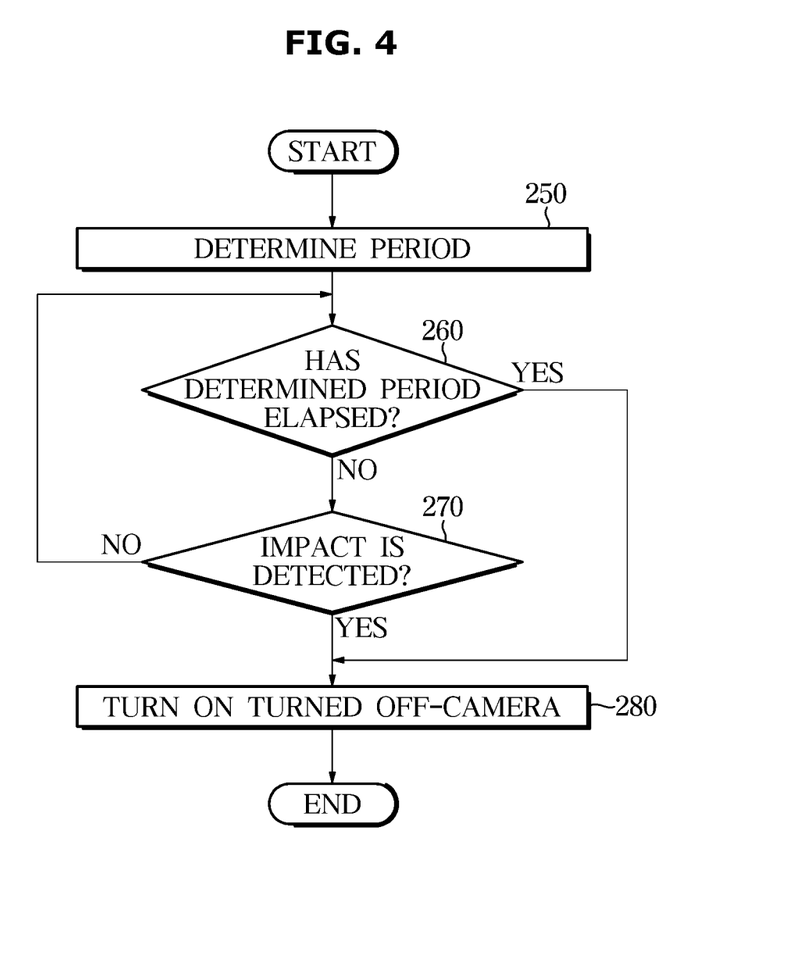
FIG. 4 is a flowchart of a control method occurring after the flowchart of FIG. 3.

FIG. 4 is a flowchart of a control method occurring after the flowchart of FIG. 3.

The controller 100 turns off the selected camera. After that, the controller 100 determines a period for performing an operation (so-called wake-up) of periodically turning on the turned off camera (250).

The period determined by the controller 100 is determined according to the parking location of the vehicle 1. For example, if it is determined that the vehicle 1 parked in the parking area, the controller 100 determines a period of time longer than when not parking in the parking area.

The controller 100 determines whether the determined period has elapsed (260).

The controller 100 counts the determined period from the time when the selected camera is turned off. When the determined period has elapsed, the controller 100 turns on the camera (Yes of 260).

When the camera is turned on, the controller 100 determines the fixed object based on the captured image. For example, the fixed object may not be a wall-like structure, but a vehicle parked near the vehicle 1. Since the parked vehicle has a high probability of being moved, the controller 100 turns on the camera every determined period and checks the existence of the fixed object. If the fixed object is changed, the controller 100 determines whether to turn off the camera again through the control method according to the flowchart of FIG. 3, and determines the wake-up period again.

During the determined period, the controller 100 detects the impact (270). If the impact is detected (Yes of 270), the controller 100 turn on the turned off camera (280).

The controller 100 determines the external impact through the gyro sensor 20, and if the impact is not detected (NO of 270), the controller 100 continuously turns off the selected camera.

Through this, the controller 100 can efficiently use the power of the battery 40 provided in the vehicle 1, thereby increasing the operating time of the plurality of cameras and preparing for external impact.

Figure 5:
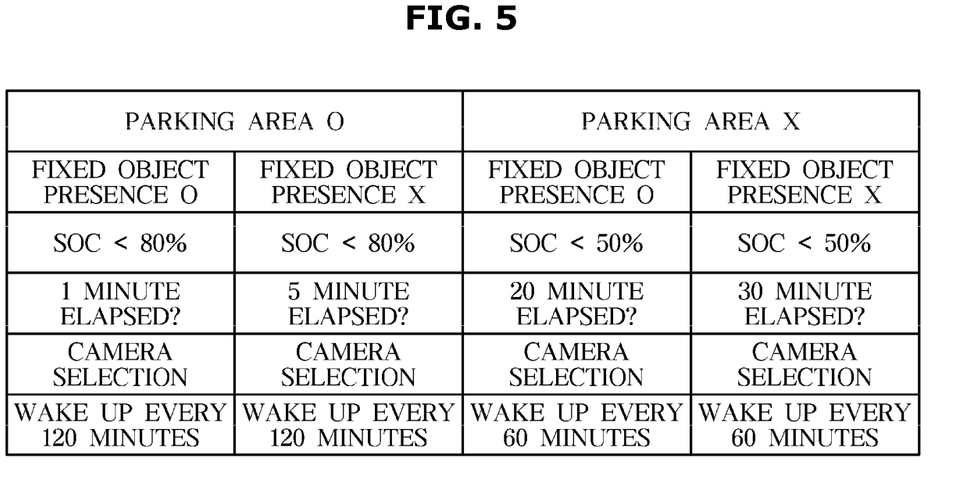
FIG. 5 is a table for explaining the off determination of the camera according to the parking location in one form of the present disclosure.

FIG. 5 is a table for explaining the off determination of the camera according to the parking location in some forms of the present disclosure.

The vehicle 1 determines the parking location. The vehicle 1 determines whether to turn off the camera through different reference values according to whether the parking location is a parking area.

When the vehicle 1 is located in the parking area, the vehicle 1 determines whether a fixed object exists through the plurality of cameras 50. When the fixed object is determined in the captured image, The vehicle 1 determines the turn off of the camera based on the first charge amount (80% of FIG. 5) of the SOC of the battery 40 and the predetermined first reference time (1 minute of FIG. 5). That is, when the amount of charge of the current SOC is 80% or less and the turn on time of the camera elapses for 1 minute, the vehicle 1 selects at least one of the cameras photographing the fixed object as a camera to be turned off. If there are a plurality of cameras photographing the fixed object, the vehicle 1 may not turn off all the cameras photographing the fixed object, but may turn off the only one of them. The vehicle 1 turns on the turned off camera every predetermined period (120 minutes in FIG. 5).

Although the vehicle 1 is located in the parking area, the fixed object may not be identified in the captured images by the plurality of cameras 50. The vehicle 1 determines the turn off of the camera based on the first charge amount (80% in FIG. 5) of the SOC of the battery 40 and the predetermined second reference time (5 minutes in FIG. 5). That is, when the amount of charge of the current SOC is 80% or less and turn on time of the camera elapses for 5 minutes, the vehicle 1 selects at least one camera among the plurality of cameras. The vehicle 1 turns off at least one camera among a plurality of turned on cameras. The vehicle 1 turns on the turned off camera every predetermined period (120 minutes in FIG. 5).

Even if the vehicle 1 is not located in the parking area, the vehicle 1 determines whether a fixed object exists through the plurality of cameras 50. When determining the fixed object in the captured image, the vehicle 1 determines the turn off of the camera based on the second charge amount (50% of FIG. 5) of the SOC of the battery 40 and the predetermined third reference time (20 minutes in FIG. 5). When the SOC charge is less than 50% and the turn on time of the camera elapses for 20 minutes, the vehicle 1 selects at least one of the cameras photographing the fixed object as a camera to be turned off. If there are a plurality of cameras photographing the fixed object, the vehicle 1 may not turn off all the cameras photographing the fixed object, but may turn off only one of them. The vehicle 1 turns on the turned off camera every predetermined second period (60 minutes in FIG. 5).

It is confirmed that the vehicle 1 does not park in the parking area, and there is no fixed object in the captured images by the plurality of cameras 50. The vehicle 1 determines the turn off of the camera based on the second charge amount (50% of FIG. 5) of the SOC of the battery 40 and the predetermined fourth reference time (30 minutes of FIG. 5). That is, when the amount of charge of the current SOC is less than 50% and turn on time of the camera elapses for 30 minutes, the vehicle 1 selects at least one of the plurality of cameras as a camera to be turned off. That is, the vehicle 1 turns off at least one camera of the plurality of cameras that are turned on. The vehicle 1 turns on the turned off camera every predetermined period (60 minutes in FIG. 5).

The disclosed vehicle 1 may increase the efficiency of power by determining the turn off of the camera and period of turn off of the camera in consideration of the parking area, fixed object, and SOC charge amount.

Figure 6:
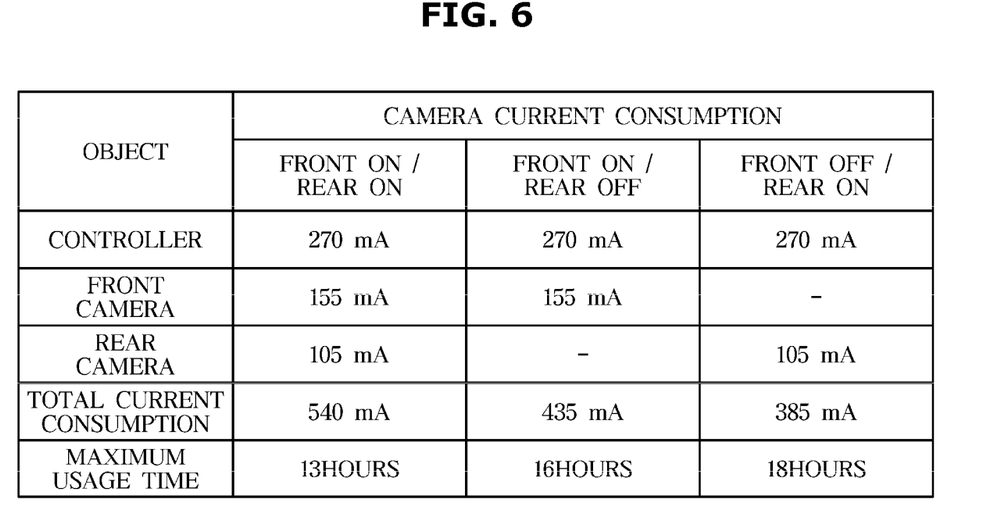
FIG. 6 is a table for explaining the effect through the control method of the disclosed vehicle.

FIG. 6 is a table for explaining the effect through the control method of the disclosed vehicle.

Referring to FIG. 6, the vehicle 1 may include a first camera (front camera) photographing the front at 2 million pixels, and a second camera (rear camera) photographing the rear at 1 million pixels. In addition, the controller 100 may include a CPU, a RAM memory, and an IC chip for performing CAN communication.

First, when the vehicle 1 parks and turns on both the front camera and the rear camera, the controller 100 may consume 270 mA of current per unit time. The front camera may consume 155 mA and the rear camera may consume 105 mA. If the cameras are all turned on, the vehicle 1 consumes 540 mA of current and can keep the cameras on for 13 hours when operated with a general vehicle battery.

However, when the presence of a fixed object is confirmed through the disclosed method of controlling the vehicle and the rear camera is turned off, the vehicle 1 consumes 435 mA of current and may operate for 16 hours. In addition, when the presence of the fixed object is confirmed and the front camera is turned off, the vehicle 1 may consume 385 mA of current and may operate for 18 hours. That is, the disclosed vehicle 1 may operate the camera by extending the maximum time by up to 5 hours than the case of turning on both the front and rear cameras.

The vehicle and the method of controlling the vehicle in some forms of the present disclosure may reduce power consumption and improve the efficiency of the camera operation in the parking mode by applying the parking area where the vehicle is located and the situation in the parking area as a factor in determining whether the camera is powered on or off.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle comprising:
a battery;
a plurality of cameras powered by the battery;
a Global Positioning System (GPS) sensor configured to detect a GPS signal;
a storage configured to store map information; and
a controller configured to:
determine a parking location based on the map information and the GPS signal;
determine a fixed object based on images captured by the plurality of cameras; and
deactivate at least one camera of the plurality of cameras based on the parking location, the fixed object and a state of charge (SOC) of the battery.

2. The vehicle of claim 1, wherein the controller is configured to:
deactivate a first camera of the plurality of cameras based on a first charge amount of the SOC and a first predetermined reference time when the fixed object is determined; and
determine that the parking location is within a parking area.

3. The vehicle of claim 2, wherein the controller is configured to:
deactivate the first camera of the plurality of cameras based on the first charge amount of the SOC and a second predetermined reference time that is longer than the first predetermined reference time when no fixed object is determined and the parking location is determined to be within the parking area.

4. The vehicle of claim 2, wherein the controller is configured to activate the first camera of the plurality of cameras when a second camera of the plurality of cameras is deactivated.

5. The vehicle of claim 2, wherein the controller is configured to:
deactivate the first camera of the plurality of cameras based on a second charge amount of the SOC and a third predetermined reference time when the parking location is determined to be out of the parking area and the fixed object is determined.

6. The vehicle of claim 5, wherein the controller is configured to:
deactivate the first camera of the plurality of cameras based on the second charge amount of the SOC and a fourth predetermined reference time that is longer than the third predetermined reference time when the parking location is determined to be out of the parking area and no fixed object is determined.

7. The vehicle of claim 5, wherein the controller is configured to activate the first camera of the plurality of cameras when the second camera of the plurality of cameras is deactivated.

8. The vehicle of claim 1, wherein the controller is configured to activate the deactivated at least one camera of the plurality of cameras corresponding to a predetermined period based on the parking location after at least one camera of the plurality of cameras is deactivated.

9. The vehicle of claim 8, wherein the vehicle further comprises:
a gyro sensor configured to detect an external impact,
wherein the controller is configured to activate the deactivated at least one camera of the plurality of cameras based on a value detected by the gyro sensor regardless of the predetermined period.

10. The vehicle of claim 8, wherein the controller is configured to deactivate at least one camera of the plurality of cameras based on the parking location, the fixed object, and the SOC of the battery after the deactivated at least one camera of the plurality of cameras is activated.

11. A method of controlling a vehicle comprising a plurality of cameras, comprising:
   determining, by a controller, a parking location based on stored map information and a GPS signal;
   determining, by the controller, a fixed object based on images captured by the plurality of cameras; and
   deactivating, by the controller, at least one camera of the plurality of cameras based on the parking location, the fixed object and a state of charge (SOC) of a battery.

12. The method of claim 11, wherein determining the parking location and the fixed object comprises:
   determining the fixed object based on images captured by a first camera of the plurality of cameras;
   determining that the parking location is within a parking area; and
   deactivating the first camera of the plurality of cameras based on a first charge amount of the SOC and a first predetermined reference time.

13. The method of claim 12, wherein determining the parking location and the fixed object comprises:
   determining that no fixed object is present and the parking location is within the parking area; and
   deactivating the first camera of the plurality of cameras based on the first charge amount of the SOC and a second predetermined time that is longer than the first predetermined reference time.

14. The method of claim 12, wherein deactivating the first camera of the plurality of cameras comprises:
   activating the first camera of the plurality of cameras when a second camera of the plurality of cameras is deactivated.

15. The method of claim 12, wherein determining the parking location and the fixed object comprises:
   determining that the parking location is out of the parking area;
   determining the fixed object based on the images captured by the first camera of the plurality of cameras; and
   deactivating the first camera of the plurality of cameras based on a second charge amount of the SOC and a third predetermined reference time.

16. The method of claim 15, wherein determining the parking location and the fixed object comprises:
   determining that the parking location is out of the parking area and no fixed object is present; and
   deactivating the first camera of the plurality of cameras based on the second charge amount of the SOC and a fourth predetermined reference time that is longer than the third predetermined reference time.

17. The method of claim 15, wherein deactivating the first camera of the plurality of cameras comprises:
   activating the first camera of the plurality of cameras when the second camera of the plurality of cameras is deactivated.

18. The method of claim 11, wherein the method further comprises:
   activating the deactivated at least one camera of the plurality of cameras corresponding to a predetermined period based on the parking location after at least one camera of the plurality of cameras is deactivated.

19. The method of claim 18, wherein activating the deactivated at least one camera of the plurality of cameras comprises:
   activating the deactivated at least one camera of the plurality of cameras based on a value detected by a gyro sensor regardless of the predetermined period.

20. The method of claim 18, wherein the method further comprises:
   deactivating at least one camera of the plurality of cameras based on the parking location, the fixed object, and the SOC of the battery after the deactivated at least one camera of the plurality of cameras is activated.

* * * * *